US012737914B2

(12) United States Patent
Hu

(10) Patent No.: US 12,737,914 B2
(45) Date of Patent: Sep. 15, 2026

(54) SPATIAL INFORMATION PREDICTION METHOD, READABLE STORAGE MEDIUM, AND ELECTRONIC DEVICE

(71) Applicant: BEIJING HORIZON INFORMATION TECHNOLOGY CO., LTD., Beijing (CN)

(72) Inventor: Zhaoyang Hu, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 195 days.

(21) Appl. No.: 18/811,965

(22) Filed: Aug. 22, 2024

(65) Prior Publication Data

US 2025/0069252 A1 Feb. 27, 2025

(30) Foreign Application Priority Data

Aug. 25, 2023 (CN) ........................ 202311085066.0

(51) Int. Cl.
*G06T 7/70* (2017.01)
*G06T 7/00* (2017.01)

(52) U.S. Cl.
CPC .............. *G06T 7/70* (2017.01); *G06T 7/0002* (2013.01); *G06T 2200/04* (2013.01)

(58) Field of Classification Search
None
See application file for complete search history.

(56) References Cited

U.S. PATENT DOCUMENTS

2013/0331145 A1* 12/2013 Liao ........................ G06T 7/593 455/556.1
2021/0065384 A1 3/2021 Sun et al.
(Continued)

FOREIGN PATENT DOCUMENTS

CN 111179339 A 5/2020
CN 107705333 B * 2/2021 ............... G06T 7/55
(Continued)

OTHER PUBLICATIONS

Extended European Search Report from corresponding European Patent Application No. 24196054.1, mailed on Jan. 23, 2025.
(Continued)

*Primary Examiner* — Bernard Krasnic
(74) *Attorney, Agent, or Firm* — K&L Gates LLP

(57) ABSTRACT

Disclosed are a spatial information prediction method and a computer readable storage medium, and an electronic device. The method includes: obtaining to-be-updated spatial information of a target object in a current image captured by a target camera on a mobile device; determining a three-dimensional prediction coordinate of the target object in the current image based on the to-be-updated spatial information; transforming the three-dimensional prediction coordinate of the target object into an image coordinate system of the current image, to obtain a two-dimensional prediction coordinate of the target object; determining a first two-dimensional detection coordinate of the target object in the current image; determining an error between the first two-dimensional detection coordinate and the two-dimensional prediction coordinate; determining prediction spatial information of the target object in the current image based on the error and the to-be-updated spatial information. According to this disclosure, accuracy of performing spatial information prediction can be improved.

15 Claims, 5 Drawing Sheets

(56) References Cited

U.S. PATENT DOCUMENTS

| | | | |
|---|---|---|---|
| 2021/0304438 | A1 | 9/2021 | Ye et al. |
| 2022/0398772 | A1 | 12/2022 | Spjuth et al. |
| 2023/0041382 | A1 | 2/2023 | Yoon |

FOREIGN PATENT DOCUMENTS

| | | | | | |
|---|---|---|---|---|---|
| CN | 112598731 | A | | 4/2021 | |
| CN | 112767489 | A | | 5/2021 | |
| CN | 113168716 | A | | 7/2021 | |
| CN | 112258547 | B | * | 9/2022 | ............... G06T 7/20 |
| CN | 112989947 | B | * | 5/2024 | ............. G06V 40/20 |

OTHER PUBLICATIONS

First Chinese office action from the corresponding Chinese patent application No. 2023110850660, mailed on Jun. 23, 2025 and its English translation.

Office Action from the corresponding European Patent Application No. 24196054.1, mailed on Feb. 25, 2026.

* cited by examiner

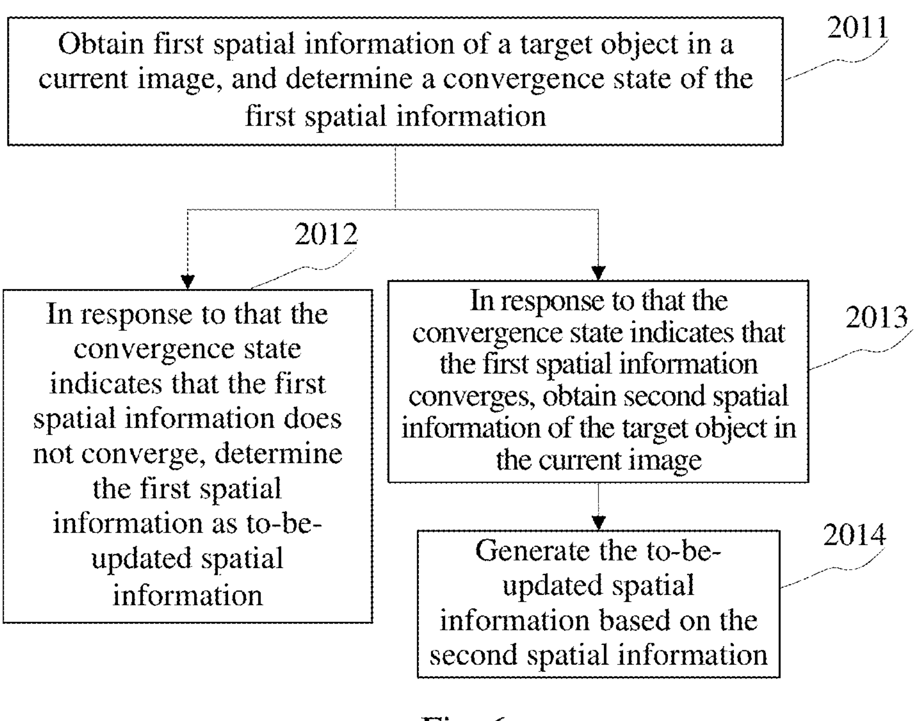

Fig. 6

In response to that a current image is an initial image captured for a target object, generate to-be-updated spatial information based on first preset spatial information

20111

In response to that the current image is not the initial image captured for the target object, determine first historical prediction spatial information

20112

Determine first spatial information based on the first historical prediction spatial information

901
Obtaining module
902
First determining module
903
Transforming module
904
Fourth determining module
905
Third determining module
906
Second determining module

SPATIAL INFORMATION PREDICTION METHOD, READABLE STORAGE MEDIUM, AND ELECTRONIC DEVICE

RELATED APPLICATION INFORMATION

This application claims priority to and the benefit of Chinese patent application Ser. No. 202311085066.0 filed on Aug. 25, 2023, incorporated herein by reference.

FIELD OF THE INVENTION

This disclosure relates to the field of computer technologies, and in particular, to a spatial information prediction method and apparatus, a computer readable storage medium, and an electronic device.

BACKGROUND OF THE INVENTION

Currently, regarding an image-based three-dimensional information perception technology, costs and occupied space are significantly reduced as compared with using devices such as a laser radar. Therefore, application fields of this technology are very extensive. For example, in the field of automated driving, an image of a surrounding is captured in a real-time manner by using a camera outside a vehicle, and a distance between the vehicle and a surrounding object may be recognized by using the image.

Existing image-based spatial perception methods typically include a camera-intrinsic-parameter ranging method, a camera-extrinsic-parameter ranging method, triangulation, and other technologies. These methods usually strongly rely on a prior physical size of a measured object or a position of the object, and cannot adapt to a variety of measured objects. Thus, accuracy of spatial perception and environmental adaptability are not strong enough.

SUMMARY OF THE INVENTION

To resolve the foregoing technical problem, embodiments of this disclosure provide a spatial information prediction method and apparatus, a computer readable storage medium, and an electronic device, having a high-precision three-dimensional spatial perception capability and strong scenario adaptability.

An embodiment of this disclosure provides a spatial information prediction method. The method includes: obtaining to-be-updated spatial information of a target object in a current image captured by a target camera on a mobile device; determining a three-dimensional prediction coordinate of the target object in the current image based on the to-be-updated spatial information; transforming the three-dimensional prediction coordinate of the target object into an image coordinate system of the current image, to obtain a two-dimensional prediction coordinate of the target object; determining a first two-dimensional detection coordinate of the target object in the current image; determining an error between the first two-dimensional detection coordinate and the two-dimensional prediction coordinate; and determining prediction spatial information of the target object in the current image based on the error and the to-be-updated spatial information.

According to another aspect of an embodiment of this disclosure, a spatial information prediction apparatus is provided. The apparatus includes: an obtaining module, configured to obtain to-be-updated spatial information of a target object in a current image captured by a target camera on a mobile device; a first determining module, configured to determine a three-dimensional prediction coordinate of the target object in the current image based on the to-be-updated spatial information; a transforming module, configured to transform the three-dimensional prediction coordinate of the target object into an image coordinate system of the current image, to obtain a two-dimensional prediction coordinate of the target object; a second determining module, configured to determine a first two-dimensional detection coordinate of the target object in the current image; a third determining module, configured to determine an error between the first two-dimensional detection coordinate and the two-dimensional prediction coordinate; and a fourth determining module, configured to determine prediction spatial information of the target object in the current image based on the error and the to-be-updated spatial information.

According to another aspect of an embodiment of this disclosure, a computer readable storage medium is provided. The computer readable storage medium stores a computer program, and the computer program is used to be executed by a processor to implement the spatial information prediction method described above.

According to another aspect of an embodiment of this disclosure, an electronic device is provided. The electronic device includes: a processor; and a memory configured to store a processor-executable instruction, wherein the processor is configured to read the executable instruction from the memory, and execute the instruction to implement the spatial information prediction method described above.

According to another aspect of an embodiment of this disclosure, a computer program product is provided. The computer program product includes computer program instructions. When the computer program instructions are executed by a processor, the spatial information prediction method provided in this disclosure is implemented.

Based on the spatial information prediction method and apparatus, the computer readable storage medium, and the electronic device that are provided in the foregoing embodiments of this disclosure, three-dimensional coordinate prediction is performed in a real-time manner on the target object in the image captured by the camera, so that the three-dimensional prediction coordinate is transformed into the two-dimensional prediction coordinate, and the error between the two-dimensional detection coordinate and the two-dimensional prediction coordinate that is obtained through real-time image detection is determined. The spatial information is iteratively updated based on the error, and high-precision prediction spatial information of the target object is finally obtained. Compared with conventional image-based ranging methods, according to the embodiments of this disclosure, spatial information prediction is performed by combining detecting a two-dimensional coordinate in a real-time manner with iterative updating the prediction spatial information, which may greatly improve accuracy of performing the spatial information prediction based on the image captured by the camera, while effectively reduce costs as compared to devices such as a laser radar.

The technical solutions of this disclosure are further described below in detail with reference to the accompanying drawings and the embodiments.

BRIEF DESCRIPTION OF THE DRAWINGS

FIG. 6 is a schematic flowchart of a spatial information prediction method according to still yet another exemplary embodiment of this disclosure;

FIG. 7 is a schematic flowchart of a spatial information prediction method according to a further exemplary embodiment of this disclosure;

DETAILED DESCRIPTION OF THE EMBODIMENTS

To explain this disclosure, exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments.

It should be noted that unless otherwise specified, the scope of this disclosure is not limited by relative arrangement, numeric expressions, and numerical values of components and steps described in these embodiments.

Application Overview

Existing image-based spatial perception methods typically include a camera-intrinsic-parameter ranging method, a camera-extrinsic-parameter ranging method, triangulation, and other technologies.

The ranging method based on a camera intrinsic parameter strongly relies on a prior physical size of a target object. For complex and diverse target object sizes (such as traffic signs), an accurate prior physical size of the target object cannot be obtained.

Regarding the ranging method based on a camera extrinsic parameter, that is, an inverse perspective transformation method, an object measured thereby needs to be a ground target, but measured objects in many scenarios are in the air (such as traffic signs or traffic lights in traffic scenarios). Obviously, this algorithm lacks universality.

The triangulation is a commonly used method for monocular camera ranging, without distinguishing between ground target objects or non-ground target objects. However, this method is a ranging method based on feature points, that is, strongly relies on a position of a feature point of the target and on precise motion information of a vehicle. Therefore, this method has low robustness and accuracy in a driving scenario.

To resolve the foregoing problems, an embodiment of this disclosure provides a spatial information prediction method. This method does not rely on conditions such as a prior physical size and a spatial position of the target object. Three-dimensional coordinate prediction is performed in a real-time manner on a target object in an image captured by a camera, so that a three-dimensional prediction coordinate is transformed into a two-dimensional prediction coordinate. Subsequently, an error between the two-dimensional detection coordinate and the two-dimensional prediction coordinate that is obtained through image detection is determined. Spatial information is iteratively updated based on the error, and high-precision prediction spatial information of the target object is finally obtained.

Exemplary System

Figure 1:
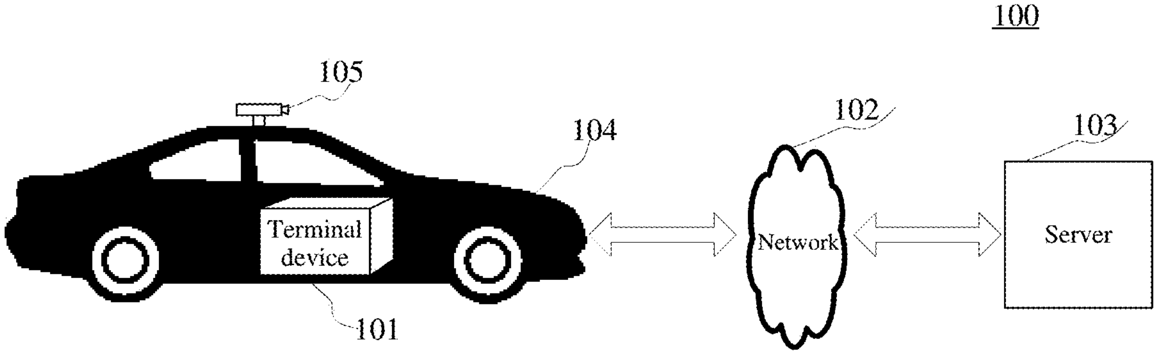
FIG. 1 is a diagram of a system to which this disclosure is applicable.

As shown in FIG. 1, a system architecture 100 may include a terminal device 101, a network 102, a server 103, and a mobile device 104. The terminal device may be disposed on the mobile device 104. The network 102 is a medium for providing a communication link between the terminal device 101 and the server 103. The network 102 may include various types of connections, such as wired and wireless communication links, or fiber optic cables.

A user may use the terminal device 101 to interact with the server 103 through the network 102, to receive or send messages. Various communication client applications may be installed on the terminal device 101, such as a map application and a navigation application.

The terminal device 101 may be any type of electronic device, including but not limited to a vehicle-mounted terminal, a mobile phone, a notebook computer, a digital broadcasting receiver, a PDA (personal digital assistant), a PAD (tablet computer), and a PMP (portable multimedia player). The terminal device 101 is usually disposed on the mobile device 104.

The mobile device 104 may be any type of device, such as a vehicle or a drone, with a camera 105 disposed thereon. The camera 105 may take photos for an environment around the mobile device 104 in a real-time manner.

The server 103 may be a server that provides various services, such as a backend image server that recognizes an image uploaded by the terminal device 101. The backend image server may perform spatial information prediction by using the received image, so as to obtain prediction spatial information, and feed the prediction spatial information back to the terminal device 101.

It should be noted that the spatial information prediction method provided in this embodiment of this disclosure may be implemented by the server 103 or the terminal device 101. Correspondingly, a spatial information prediction apparatus may be disposed in the server 103 or the terminal device 101.

It should be understood that quantities of terminal devices 101, networks 102, servers 103, and mobile devices 104 in FIG. 1 are only for examples. According to implementation requirements, there may be any quantities of terminal devices 101, networks 102, servers 103, and mobile devices 104. When the image is not required to be obtained remotely, the foregoing system architecture may do not include the network and the server, but only include the mobile device 104 and the terminal device 101.

Exemplary Method

Figure 2:
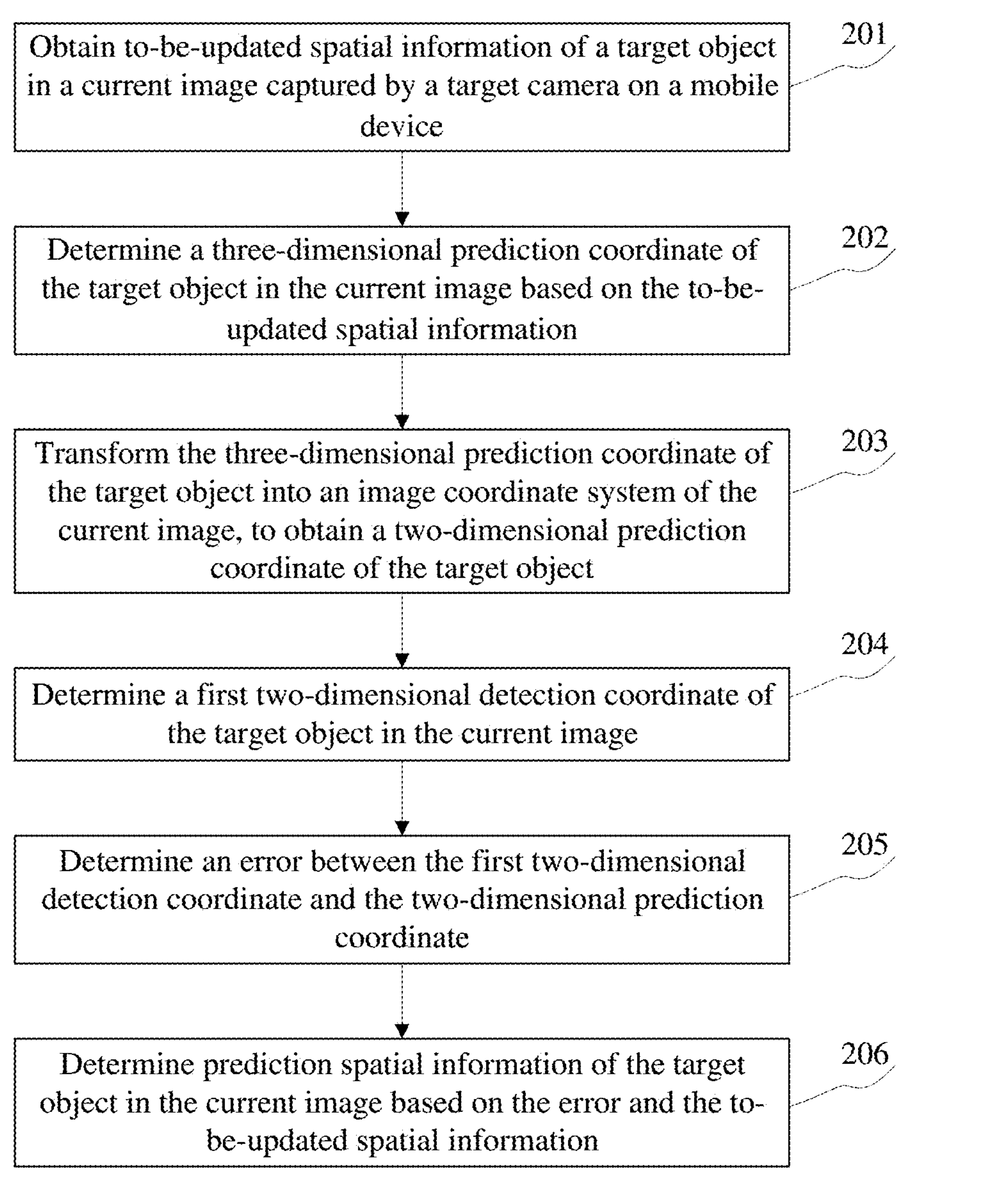
FIG. 2 is a schematic flowchart of a spatial information prediction method according to an exemplary embodiment of this disclosure.

FIG. 2 is a schematic flowchart of a spatial information prediction method according to an exemplary embodiment of this disclosure. This embodiment may be applied to an electronic device (such as a terminal device 101 or a server 103 shown in FIG. 1). As shown in FIG. 2, the method includes the following steps.

Step 201. Obtain to-be-updated spatial information of a target object in a current image captured by a target camera on a mobile device.

The mobile device may be a mobile device 104 shown in FIG. 1, and the target camera is a camera 105 shown in FIG. 1. The target camera takes photos for an environment around the mobile device in a real-time manner. The target object is any type of object located within a shooting range of the target camera, such as a vehicle, a pedestrian, a traffic sign, or a traffic light.

The to-be-updated spatial information is spatial information to be iteratively updated. Generally, if the current image is a first frame of image captured for the target object by the target camera, the to-be-updated spatial information may be preset initialization spatial information (such as 0). If the current image is not the first frame of image captured for the target object by the target camera, the to-be-updated spatial information is prediction spatial information corresponding to an image captured prior to a moment corresponding to the current image.

The to-be-updated spatial information herein may be information that represents a relative positional relationship between the mobile device (or the target camera) and the target object in a three-dimensional space. For example, the to-be-updated spatial information may include inverse depth information, that is, a reciprocal of depth information representing a distance between the target camera and the target object; and may also include a three-dimensional coordinate of the target object in a camera coordinate system of the target camera, etc.

Step 202. Determine a three-dimensional prediction coordinate of the target object in the current image based on the to-be-updated spatial information.

Generally, the three-dimensional prediction coordinate of the target object may be determined based on different types of to-be-updated spatial information in different coordinate transformation manners.

For example, if the to-be-updated spatial information includes the inverse depth information, a three-dimensional coordinate corresponding to the first frame of image captured for the target object may be obtained. The three-dimensional prediction coordinate of the target object is calculated based on a pose transformation matrix of the target camera at the corresponding moment of the current image relative to a corresponding moment of the first frame of image.

For another example, if the to-be-updated spatial information includes a three-dimensional coordinate of the target object in a world coordinate system, the three-dimensional prediction coordinate of the target object in the camera coordinate system may be calculated based on the pose transformation matrix from the world coordinate system to the camera coordinate system.

For a calculation method of calculating the three-dimensional prediction coordinate of the target object based on the inverse depth information and the three-dimensional coordinate, reference may be made to the following optional embodiments.

Step 203. Transform the three-dimensional prediction coordinate of the target object into an image coordinate system of the current image, to obtain a two-dimensional prediction coordinate of the target object.

Generally, the three-dimensional prediction coordinate is transformed into the image coordinate system by using an intrinsic parameter of the target camera, to obtain the two-dimensional prediction coordinate.

Step 204. Determine a first two-dimensional detection coordinate of the target object in the current image.

The first two-dimensional detection coordinate is obtained by performing object detection on the current image. The object detection may be implemented through various manners. For example, a neural network-based object detection model YOLO may be used to detect a coordinate representing a position of the target object from the current image to serve as the first two-dimensional detection coordinate.

Step 205. Determine an error between the first two-dimensional detection coordinate and the two-dimensional prediction coordinate.

Specifically, a distance between the first two-dimensional detection coordinate and the two-dimensional prediction coordinate may be calculated to serve as the error, or a difference between the two coordinates may be directly calculated to serve as the error.

Step 206. Determine prediction spatial information of the target object in the current image based on the error and the to-be-updated spatial information.

Optionally, when the to-be-updated spatial information including the inverse depth information, the to-be-updated spatial information may be updated according to the following formula:

$$\widehat{d_k} = d_k + K * y. \tag{1}$$

$d_k$ represents the inverse depth information included in the to-be-updated spatial information; K represents a gain coefficient; y represents the error between the first two-dimensional detection coordinate and the two-dimensional prediction coordinate; and $\widehat{d_k}$ represents updated inverse depth information, that is, the prediction spatial information.

Optionally, when the to-be-updated spatial information including the three-dimensional coordinate of the target object in the world coordinate system, the to-be-updated spatial information may be updated according to the following formula:

$$\widehat{p_w} = p_w + K * y. \tag{2}$$

$p_w$ represents the three-dimensional coordinate included in the to-be-updated spatial information; and $\widehat{p_w}$ represents an updated three-dimensional coordinate, that is, the prediction spatial information.

According to the method provided in the foregoing embodiment of this disclosure, three-dimensional coordinate prediction is performed in a real-time manner on the target object in the image captured by the camera, so that the three-dimensional prediction coordinate is transformed into the two-dimensional prediction coordinate, and the error between the two-dimensional detection coordinate and the two-dimensional prediction coordinate that is obtained through real-time image detection is determined. The spatial information is iteratively updated based on the error, and high-precision prediction spatial information of the target object is finally obtained. Compared with conventional image-based ranging methods, according to this embodiment of this disclosure, spatial information prediction is performed by combining detecting a two-dimensional coordinate in a real-time manner with iterative updating the prediction spatial information, which may greatly improve accuracy of performing the spatial information prediction based on the image captured by the camera, while effectively reduce costs as compared to devices such as a laser radar.

Figures 3, 4, 5:
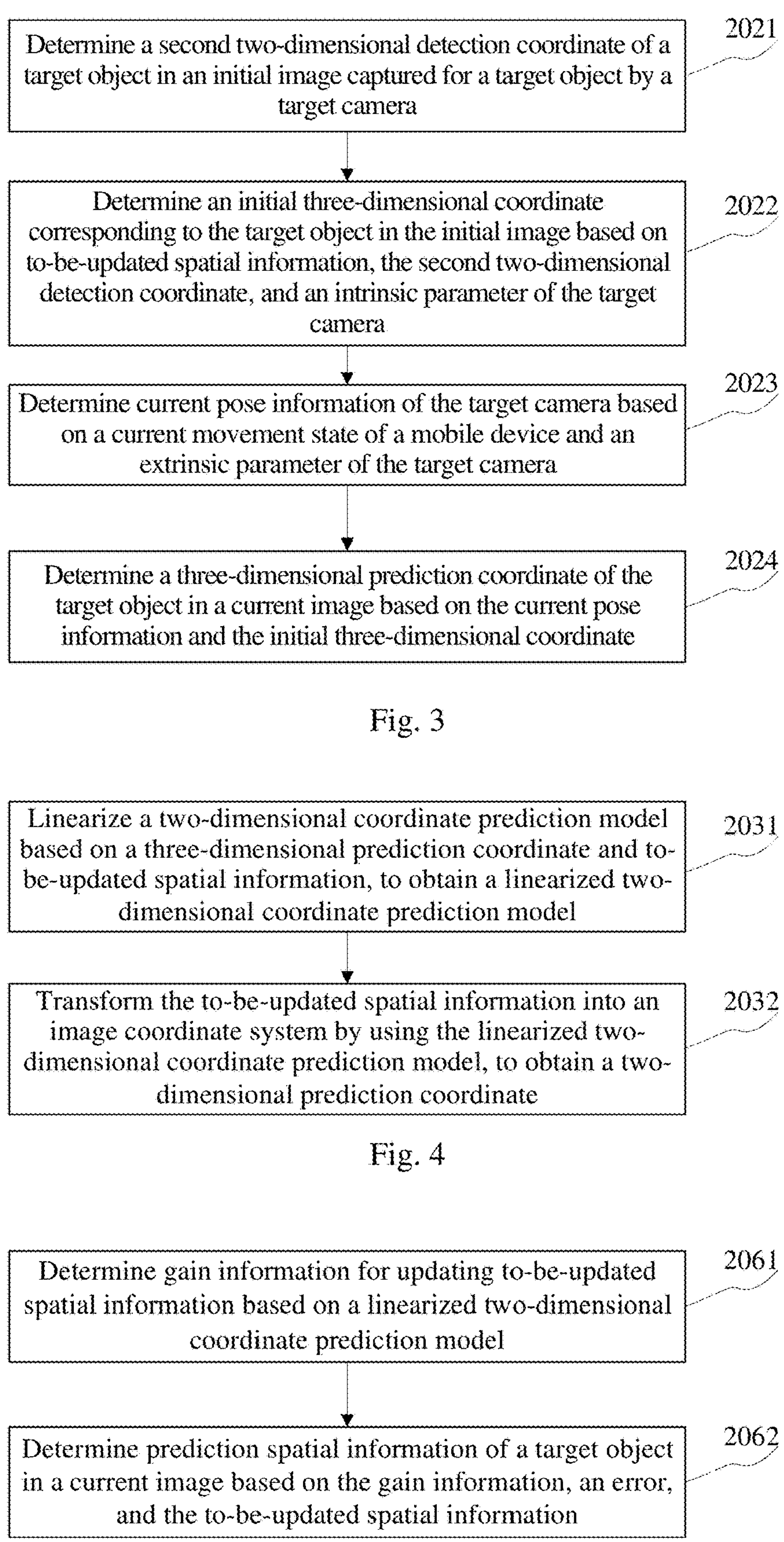
FIG. 3 is a schematic flowchart of a spatial information prediction method according to another exemplary embodiment of this disclosure.
FIG. 4 is a schematic flowchart of a spatial information prediction method according to still another exemplary embodiment of this disclosure.
FIG. 5 is a schematic flowchart of a spatial information prediction method according to yet another exemplary embodiment of this disclosure.

In some optional implementations, as shown in FIG. 3, step 202 includes the following steps.

Step 2021. Determine a second two-dimensional detection coordinate of the target object in an initial image captured for the target object by the target camera.

The initial image is a first frame of image used for iteratively updating a specific type of prediction spatial information. For example, when the prediction spatial information is the inverse depth information, the initial image may be the first frame of image captured for the target object. When the prediction spatial information is the three-dimensional coordinate of the target object, the initial image may be a first frame of image captured after the inverse depth information converges.

The electronic device may detect the target object in the initial image by using a target detection method, so as to determine the two-dimensional detection coordinate of the target object as the second two-dimensional detection coordinate.

Step 2022. Determine an initial three-dimensional coordinate corresponding to the target object in the initial image based on the to-be-updated spatial information, the second two-dimensional detection coordinate, and an intrinsic parameter of the target camera.

Optionally, if the to-be-updated spatial information is the inverse depth information, the initial three-dimensional coordinate $p_{c_0}$ may be calculated according to the following formulas:

$$p_{c_0} = \begin{vmatrix} x_0 \\ y_0 \\ z_0 \end{vmatrix} = \begin{vmatrix} f_x & 0 & c_x \\ 0 & f_y & c_y \\ 0 & 0 & 1 \end{vmatrix}^{-1} * \begin{vmatrix} u_0 \\ v_0 \\ 1 \end{vmatrix} / d_k\text{; and} \tag{3}$$

$$d_k = d_{k-1}. \tag{4}$$

k represents a sequence number of a current frame; and $d_k$ represents the inverse depth information, that is, the to-be-updated spatial information. Formula (4) indicates that inverse depth information $d_k$ of a $k^{th}$ frame of image is obtained from inverse depth information $d_{k-1}$ of a previous frame of image. $(u_0, v_0)$ represents the second two-dimensional detection coordinate of the target object, and $$\begin{vmatrix} f_x & 0 & c_x \\ 0 & f_y & c_y \\ 0 & 0 & 1 \end{vmatrix}$$

represents the intrinsic parameter of the target camera. It should be understood that the initial three-dimensional coordinate $p_{c_0}$ herein is in the camera coordinate system.

Optionally, if the to-be-updated spatial information is the three-dimensional coordinate of the target object in the world coordinate system, the initial three-dimensional coordinate $$p_0^w$$

may be calculated according to the following formula:

$$p_0^w = T_{c_o}^w * \begin{vmatrix} x_0 \\ y_0 \\ z_0 \end{vmatrix}. \tag{5}$$

$(x_0, y_0, z_0)$ may be calculated by using formula (3), and $$T_{c_o}^w$$

represents a pose transformation matrix from the camera coordinate system to the world coordinate system at a corresponding moment of the initial image. It should be understood that the initial three-dimensional coordinate $$p_0^w$$

herein is in the world coordinate system.

Step 2023. Determine current pose information of the target camera based on a current movement state of the mobile device and an extrinsic parameter of the target camera.

The movement state may include a speed, a steering angle, and the like of the mobile device. The extrinsic parameter of the target camera is used for transformation between the camera coordinate system and the world coordinate system.

Optionally, if the to-be-updated spatial information is the inverse depth information, the electronic device may use the extrinsic parameter to transform the three-dimensional coordinate of the target object at the corresponding moment of the initial image from the camera coordinate system into the world coordinate system; and then determine, based on the speed, the steering angle, and other information of the mobile device, the current pose information representing a relative pose of the target camera between the corresponding moment of the current image and the corresponding moment of the initial image. The current pose information may be calculated according to the following formula:

$$T_{c_o}^{c_k} = \begin{vmatrix} R & t \\ 0 & 1 \end{vmatrix}. \tag{6}$$

R and t represent a rotation quantity and a translation quantity; $c_0$ represents the corresponding moment of the initial image; and $c_k$ represents a corresponding moment of the $k^{th}$ frame of image (that is, the current image), wherein c indicates that the current pose information is in the camera coordinate system.

Optionally, if the to-be-updated spatial information is the three-dimensional coordinate of the target object in the world coordinate system, the current pose information is represented by using $$T_w^j,$$

which represents a pose transformation matrix that is from the world coordinate system to the camera coordinate system and corresponds to a $j^{th}$ frame of image (that is, the current image). Usually, a process of using the three-dimensional coordinate of the target object in the world coordinate system as the to-be-updated spatial information to perform the spatial information prediction is implemented after it is determined that the inverse depth information converges. Therefore, herein, it is needed to first use the movement state and the extrinsic parameter to obtain the $$T_{c_o}^{c_k}$$

shown in formula (6), and then transform the three-dimensional coordinate of the target object into the world coordinate system for iterative updates in the world coordinate system. After each iteration update, $$T_w^j$$

is used to transform the three-dimensional coordinate into a camera coordinate, and then transform the same into a two-dimensional coordinate system of the image to calculate the error.

Step 2024. Determine the three-dimensional prediction coordinate of the target object in the current image based on the current pose information and the initial three-dimensional coordinate.

Optionally, if the to-be-updated spatial information is the inverse depth information, the three-dimensional prediction coordinate may be calculated according to the following formula:

$$p_{c_k} = \begin{vmatrix} x_k \\ y_k \\ z_k \end{vmatrix} = T_{c_o}^{c_k} * p_{c_o}. \tag{7}$$

$p_{c_0}$ is obtained according to formula (3).

Optionally, if the to-be-updated spatial information is the three-dimensional coordinate of the target object in the world coordinate system, the three-dimensional prediction coordinate may be calculated according to the following formulas:

$$p_{c_j} = \begin{vmatrix} x_j \\ y_j \\ z_j \end{vmatrix} = T_w^j * P_j^w; \tag{8}$$

and $$p_j^w = p_{j-1}^w + w_j. \tag{9}$$

Formula (8) indicates that a three-dimensional prediction coordinate $$p_j^w$$

of the $j^{th}$ frame of image is obtained by adding a three-dimensional prediction coordinate $$p_{j-1}^w$$

of a previous frame of image to observation noise of the $j^{th}$ frame of image. In other words, $$p_j^w$$

is iteratively calculated based on the initial three-dimensional coordinate $$p_0^w.$$

It should be noted that both $p_{c_k}$ and $p_{c_j}$ are in the camera coordinate system, while $$p_j^w$$

is in the world coordinate system.

According to this embodiment, the current pose information and the initial three-dimensional coordinate corresponding to the target object in the initial image are determined, and the three-dimensional prediction coordinate of the target object is determined based on the current pose information and the initial three-dimensional coordinate, so that the three-dimensional prediction coordinate of the target object can be obtained in a real-time manner more accurately.

In some optional implementations, step 203 may be performed as below:

calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image.

The two-dimensional coordinate prediction model may be a Kalman filtering model or an extended Kalman filtering model.

Optionally, if the to-be-updated spatial information is the inverse depth information, formula (4) may be used as a state model of the extended Kalman filtering model. Observation models of the extended Kalman filtering model include the foregoing formulas (6) and (7) and the following formula (10):

$$\begin{vmatrix} \check{u}_k \\ \check{v}_k \\ 1 \end{vmatrix} 1/z_k * \begin{vmatrix} f_x & 0 & c_x \\ 0 & f_y & c_y \\ 0 & 0 & 1 \end{vmatrix} * p_{c_k}. \tag{10}$$

Wherein ($\check{u}_k$, $\check{v}_k$) represents the two-dimensional prediction coordinate in the image coordinate system of the current image. $z_k$ represents a depth value of the target object at the corresponding moment of the current image.

Optionally, if the to-be-updated spatial information is the three-dimensional coordinate of the target object in the world coordinate system, formula (9) may be used as a state model of the extended Kalman filtering model. Observation models of the extended Kalman filtering model include the foregoing formula (8) and the following formula (11):

$$\begin{vmatrix} \check{u}_j \\ \check{v}_j \\ 1 \end{vmatrix} = \frac{1}{z_j} * \begin{vmatrix} f_x & 0 & c_x \\ 0 & f_y & c_y \\ 0 & 0 & 1 \end{vmatrix} * p_{c_j} + v_j. \tag{11}$$

$(\check{u}_j, \check{v}_j)$ represents the two-dimensional prediction coordinate in the image coordinate system of the current image; z; represents a depth value of the target object at the corresponding moment of the current image; and v represents observation noise, and a value thereof may be manually set.

According to this embodiment, the two-dimensional prediction coordinate may be iteratively solved automatically by using the two-dimensional coordinate prediction model, which helps to improve accuracy of calculating the two-dimensional prediction coordinate.

In some optional implementations, as shown in FIG. 4, step 203 further includes the following steps.

Step 2031. Linearize the two-dimensional coordinate prediction model based on the three-dimensional prediction coordinate and the to-be-updated spatial information, to obtain a linearized two-dimensional coordinate prediction model.

Specifically, since division operations are involved in the observation model, the observation model is a nonlinear model. Therefore, a nonlinear model may be linearized by calculating a Jacobian matrix.

Optionally, if the to-be-updated spatial information is the inverse depth information, a derivative is taken for the inverse depth information d according to formula (10), to obtain a Jacobian matrix shown in the following formula (12):

$$H1 = \partial \begin{vmatrix} \check{u}_k \\ \check{v}_k \\ 1 \end{vmatrix} \Big/ \partial \mathrm{d}_k = \begin{vmatrix} f_x/z_k & 0 & -f_x/z_k^2 \\ 0 & f_y/z_k & -f_y/z_k^2 \end{vmatrix} * R * \begin{vmatrix} f_x & 0 & c_x \\ 0 & f_y & c_y \\ 0 & 0 & 1 \end{vmatrix}^{-1} * \begin{vmatrix} u_0 \\ v_0 \\ 1 \end{vmatrix} \Big/ (d_k^2). \tag{12}$$

R represents a rotation matrix.

Optionally, if the to-be-updated spatial information is the three-dimensional coordinate of the target object in the world coordinate system, a derivative is taken for the three-dimensional coordinate according to formula (11), to obtain a Jacobian matrix shown in the following formula (13):

$$H2 = \partial \begin{vmatrix} \check{u}_j \\ \check{v}_j \\ 1 \end{vmatrix} \Big/ \partial p_j^w = \begin{vmatrix} f_x/z_j & 0 & -f_x/z_j^2 \\ 0 & f_y/z_j & -f_y/z_j^2 \end{vmatrix} * R. \tag{13}$$

Step 2032. Transform the to-be-updated spatial information into the image coordinate system by using the linearized two-dimensional coordinate prediction model, to obtain the two-dimensional prediction coordinate.

Optionally, if the to-be-updated spatial information is the inverse depth information, the two-dimensional prediction coordinate is represented by using $H1*d_k$.

Optionally, if the to-be-updated spatial information is the three-dimensional coordinate of the target object in the world coordinate system, the two-dimensional prediction coordinate is represented by using $$H2 * p_j^w.$$

According to this embodiment, the two-dimensional coordinate prediction model is linearized and the two-dimensional prediction coordinate is determined by using the linearized two-dimensional coordinate prediction model, so that a calculation process may be simplified, thereby improving calculation efficiency.

In some optional implementations, as shown in FIG. 5, step 206 includes the following steps.

Step 2061. Determine gain information for updating the to-be-updated spatial information based on the linearized two-dimensional coordinate prediction model.

Optionally, if the to-be-updated spatial information is the inverse depth information, a Kalman gain matrix may be calculated according to the following formula to serve as the gain information:

$$K1 = P_k * H1^T * (H1 * P_k * H1^T + R)^{-1}. \tag{14}$$

$P_k$ represents a covariance estimation matrix obtained by the extended Kalman filtering model at a corresponding moment of the $k^{th}$ frame of image. An initial value of the covariance estimation matrix (that is, a value at the corresponding moment of the initial image) may be arbitrarily set, for example, may be set to 0. Subsequently, each frame of image is iteratively updated sequentially. To be specific, $P_k$ is obtained based on a covariance estimation matrix $P_{k-1}$ corresponding to a previous frame of image. An update formula for the covariance estimation matrix is as follows:

$$P_k = P_{k-1} + Q. \tag{15}$$

Q represents a noise matrix, and a value thereof may be manually set.

Optionally, if the to-be-updated spatial information is the three-dimensional coordinate of the target object in the world coordinate system, a Kalman gain matrix may be calculated according to the following formula to serve as the gain information:

$$K2 = P_j * H2^T * (H2 * P_j * H2^T + R)^{-1}. \tag{16}$$

$P_j$ represents a covariance estimation matrix obtained by the extended Kalman filtering model at a corresponding moment of the $j^{th}$ frame of image. A calculation method for $P_j$ is same as that for $P_k$.

Step 2062. Determine prediction spatial information of the target object in the current image based on the gain information, the error, and the to-be-updated spatial information.

Optionally, if the to-be-updated spatial information is the inverse depth information, a first two-dimensional detection coordinate of the target object corresponding to the $k^{th}$ frame of image (the current image) is $g_k = |u_k\ v_k\ 1|^T$, and an error between the first two-dimensional detection coordinate and the two-dimensional prediction coordinate is shown in the following formula:

$$y1 = g_k - H1 * d_k. \tag{17}$$

In this case, the prediction spatial information of the target object in the current image is shown in the following formula:

$$\widehat{d_k} = d_k + K1 * y1. \tag{18}$$

$\widehat{d_k}$ represents predicted inverse depth information that is used as the prediction spatial information.

Optionally, if the to-be-updated spatial information is the three-dimensional coordinate of the target object in the world coordinate system, a first two-dimensional detection coordinate of the target object corresponding to the $j^{th}$ frame of image (the current image) is $g_j = |u_j\ v_j\ 1|^T$, and an error between the first two-dimensional detection coordinate and the two-dimensional prediction coordinate is shown in the following formula:

$$y2 = g_j - H2 * p_j^w. \tag{19}$$

In this case, the prediction spatial information of the target object in the current image is shown in the following formula:

$$\widehat{p_j^w} = p_j^w + K2 * y2. \tag{20}$$

According to this embodiment, the to-be-updated spatial information is iteratively updated by using the linearized two-dimensional coordinate prediction model to obtain the prediction spatial information corresponding to the current image. This can effectively utilize correlation between positions of the target object in various frames of images, thereby improving accuracy of obtaining the prediction spatial information.

In some optional implementations, as shown in FIG. 6, step 201 includes the following steps.

Step 2011. Obtain first spatial information of the target object in the current image, and determine a convergence state of the first spatial information.

The first spatial information includes inverse depth information of the target object. It may be learned from formula (4) that inverse depth information $d_{k-1}$ corresponding to a previous frame of the current image may be used as the first spatial information $d_k$. The transformation state may be determined based on a difference between the first spatial information corresponding to the current image and the first spatial information corresponding to the previous frame of image. For example, if the difference is less than or equal to a preset threshold, it is determined that the first spatial information converges.

If the convergence state indicates that the first spatial information does not converge, step 2012 is performed. If the convergence state indicates that the first spatial information converges, step 2013 is performed.

Step 2012. In response to that the convergence state indicates that the first spatial information does not converge, determine the first spatial information as the to-be-updated spatial information.

In a non-converging state, $d_k$ is used as the to-be-updated spatial information, and subsequent iterative updating steps are performed based on $d_k$, until the inverse depth information converges.

Step 2013. In response to that the convergence state indicates that the first spatial information converges, obtain second spatial information of the target object in the current image.

The second spatial information includes the three-dimensional coordinate of the target object. The three-dimensional coordinate of the target object is represented by using the $$p_j^w$$

in the foregoing formulas. According to formula (9), the three-dimensional coordinate corresponding to the current image is obtained based on the three-dimensional coordinate corresponding to the previous frame of the current image, to serve as the second spatial information.

Step 2014. Generate the to-be-updated spatial information based on the second spatial information.

To be specific, $$p_j^w$$

may be determined as the to-be-updated spatial information, and the subsequent iterative updating steps may be performed based on $$p_j^w,$$

until the three-dimensional coordinate of the target object converges.

According to this embodiment, the inverse depth information is first iteratively updated, and then the three-dimensional coordinate is iteratively updated when the inverse depth information converges, so that the three-dimensional coordinate is further accurately predicted on the basis that the inverse depth information is accurately predicted. Thus, accuracy of predicting a spatial position of the target object is greatly improved.

In some optional implementations, as shown in FIG. 7, step 2011 includes the following steps.

Step 20111: In response to that the current image is the initial image captured for the target object, generate the to-be-updated spatial information based on first preset spatial information.

The first preset spatial information is any preset inverse depth information, for example, may be set to 0.02. The initial image is the first frame of image when the target object is detected. In other words, when the target object is detected, the first preset spatial information is determined as the to-be-updated spatial information. Subsequently, the iterative updating steps are performed based on the to-be-updated spatial information.

Step 20112. In response to that the current image is not the initial image captured for the target object, determine first historical prediction spatial information.

The first historical prediction spatial information represents prediction spatial information obtained by performing spatial information prediction on an historical image prior to the current image. For example, if the current image is the $k^{th}$ frame of image, the first historical prediction spatial information is represented by using $d_{k-1}$.

Step 20113. Determine the first spatial information based on the first historical prediction spatial information.

Optionally, the first historical prediction spatial information $d_{k-1}$ may be determined as the first spatial information $d_k$ by using the state model of the extended Kalman filtering model for the inverse depth information, that is, according to formula (4).

According to this embodiment, the inverse depth information is initialized at a moment when the initial image of the target object is captured; and subsequently, during processing of subsequent captured images, the inverse depth information of the target object used for updating the current image is obtained based on the inverse depth information of the target object in a previous image. This helps to iteratively update the inverse depth information based on consecutively captured images, to associate inverse depth information corresponding to various frames of images, thereby improving accuracy of determining the inverse depth information.

Figures 8, 9:
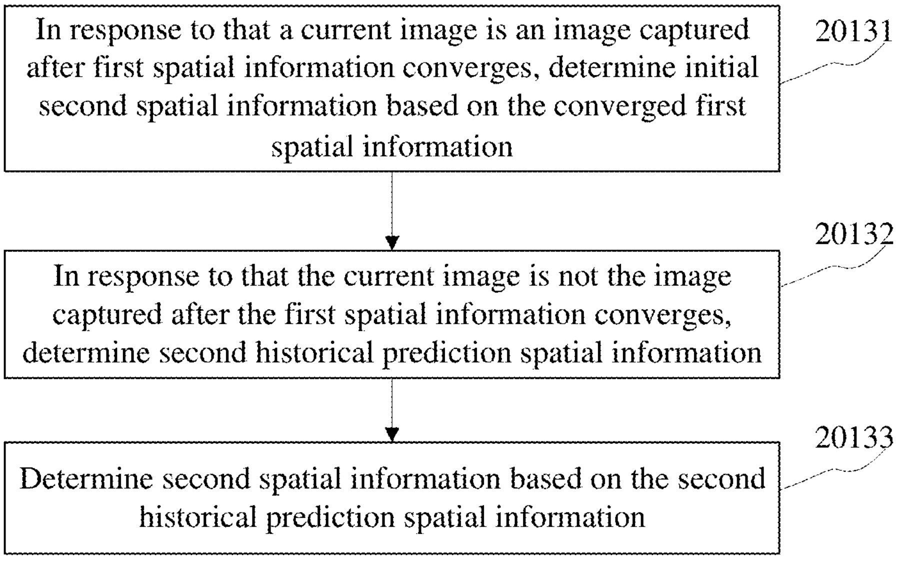
FIG. 8 is a schematic flowchart of a spatial information prediction method according to a still further exemplary embodiment of this disclosure.
FIG. 9 is a schematic diagram of a structure of a spatial information prediction apparatus according to an exemplary embodiment of this disclosure.

In some optional implementations, as shown in FIG. 8, step 2013 includes the following steps.

Step 20131: In response to that the current image is an image captured after the first spatial information converges, determine initial second spatial information based on the converged first spatial information.

The converged first spatial information may represent relatively accurate depth information (that is, a z-coordinate value) of the target object, while an x-coordinate value and a y-coordinate value cannot be accurately predicted. Therefore, after the inverse depth information converges, the three-dimensional coordinate of the current target object may be determined as the initial second spatial information based on the obtained inverse depth information.

Optionally, the initial second spatial information may be determined according to formula (5), and $(x_0, y_0, z_0)$ in formula (5) may be calculated according to formula (3). It should be noted that the $(x_0, y_0, z_0)$ herein represents a three-dimensional coordinate corresponding to an image captured after the first spatial information converges, rather than the three-dimensional coordinate corresponding to the first frame of image captured for the target object.

Step 20132. In response to that the current image is not the image captured after the first spatial information converges, determine second historical prediction spatial information.

The second historical prediction spatial information represents prediction spatial information obtained by performing spatial information prediction on an historical image prior to the current image. For example, if the current image is the $j^{th}$ frame of image, the second historical prediction spatial information is represented by using $$p_{j-1}^{w}.$$

Step 20133: Determine the second spatial information based on the second historical prediction spatial information.

Optionally, the second spatial information $$p_j^w$$

may be calculated based on the second historical prediction spatial information $$p_{j-1}^{w}$$

by using the state model of the extended Kalman filtering model for the three-dimensional coordinate, that is, according to formula (9).

According to this embodiment, after it is predicted that the inverse depth information converges, the three-dimensional coordinate is further determined as the initial second depth information based on the converged inverse depth information; and subsequently, during the processing of the subsequent captured images, the three-dimensional coordinate used for updating the current image is obtained based on the three-dimensional coordinate of the previous image. This helps to further iteratively update the three-dimensional coordinate based on the consecutively captured images on the basis that high-precision inverse depth information is obtained, to associate three-dimensional coordinates corresponding to various frames of images, thereby improving accuracy of determining the three-dimensional coordinate.

Exemplary Apparatus

FIG. 9 is a schematic diagram of a structure of a spatial information prediction apparatus according to an exemplary embodiment of this disclosure. This embodiment may be applied to an electronic device. As shown in FIG. 9, the spatial information prediction apparatus includes: an obtaining module 901, configured to obtain to-be-updated spatial information of a target object in a current image captured by a target camera on a mobile device; a first determining module 902, configured to determine a three-dimensional prediction coordinate of the target object in the current image based on the to-be-updated spatial information; a transforming module 903, configured to transform the three-dimensional prediction coordinate of the target object into an image coordinate system of the current image, to obtain a two-dimensional prediction coordinate of the target object; a second determining module 904, configured to determine a first two-dimensional detection coordinate of the target object in the current image; a third determining module 905, configured to determine an error between the first two-dimensional detection coordinate and the two-dimensional prediction coordinate; and a fourth determining module 906, configured to determine prediction spatial information of the target object in the current image based on the error and the to-be-updated spatial information.

In this embodiment, the obtaining module 901 may be configured to obtain the to-be-updated spatial information of the target object in the current image captured by the target camera on the mobile device.

The mobile device may be a mobile device 104 shown in FIG. 1, and the target camera is a camera 105 shown in FIG. 1. The target camera takes photos for an environment around the mobile device in a real-time manner. The target object is any type of object located within a shooting range of the target camera, such as a vehicle, a pedestrian, a traffic sign, or a traffic light.

The to-be-updated spatial information is spatial information to be iteratively updated. Generally, if the current image is a first frame of image captured for the target object by the target camera, the to-be-updated spatial information may be preset initialization spatial information (such as 0). If the current image is not the first frame of image captured for the target object by the target camera, the to-be-updated spatial information is prediction spatial information corresponding to an image captured prior to a moment corresponding to the current image.

The to-be-updated spatial information herein may be information that represents a relative positional relationship between the mobile device (or the target camera) and the target object in a three-dimensional space. For example, the to-be-updated spatial information may include inverse depth information, that is, a reciprocal of depth information representing a distance between the target camera and the target object; and may also include a three-dimensional coordinate of the target object in a camera coordinate system of the target camera.

In this embodiment, the first determining module 902 may be configured to determine the three-dimensional prediction coordinate of the target object in the current image based on the to-be-updated spatial information.

Generally, the three-dimensional prediction coordinate of the target object may be determined based on different types of to-be-updated spatial information in different coordinate transformation manners.

For example, if the to-be-updated spatial information includes the inverse depth information, a three-dimensional coordinate corresponding to the first frame of image captured for the target object may be obtained. The three-dimensional prediction coordinate of the target object is calculated based on a pose transformation matrix of the target camera at the corresponding moment of the current image relative to a corresponding moment of the first frame of image.

For another example, if the to-be-updated spatial information includes a three-dimensional coordinate of the target object in a world coordinate system, the three-dimensional prediction coordinate of the target object in the camera coordinate system may be calculated based on the pose transformation matrix from the world coordinate system to the camera coordinate system.

For a calculation method of calculating the three-dimensional prediction coordinate of the target object based on the inverse depth information and the three-dimensional coordinate, reference may be made to the following optional embodiments.

In this embodiment, the transforming module 903 may be configured to transform the three-dimensional prediction coordinate of the target object into the image coordinate system of the current image, to obtain the two-dimensional prediction coordinate of the target object.

Generally, the three-dimensional prediction coordinate is transformed into the image coordinate system by using an intrinsic parameter of the target camera, to obtain the two-dimensional prediction coordinate.

In this embodiment, the second determining module 904 may be configured to determine a first two-dimensional detection coordinate of the target object in the current image.

The first two-dimensional detection coordinate is obtained by performing object detection on the current image. The object detection may be implemented through various manners. For example, a neural network-based object detection model YOLO may be used to detect a coordinate representing a position of the target object from the current image to serve as the first two-dimensional detection coordinate.

In this embodiment, the third determining module 905 may be configured to determine the error between the first two-dimensional detection coordinate and the two-dimensional prediction coordinate.

Specifically, a distance between the first two-dimensional detection coordinate and the two-dimensional prediction coordinate may be calculated to serve as the error, or a difference between the two coordinates may be directly calculated to serve as the error.

In this embodiment, the fourth determining module 906 may be configured to determine the prediction spatial information of the target object in the current image based on the error and the to-be-updated spatial information.

Optionally, when the to-be-updated spatial information including the inverse depth information, the to-be-updated spatial information may be updated according to the foregoing formula (1). Optionally, when the to-be-updated spatial information including the three-dimensional coordinate of the target object in the world coordinate system, the to-be-updated spatial information may be updated according to the foregoing formula (2).

Figure 10:
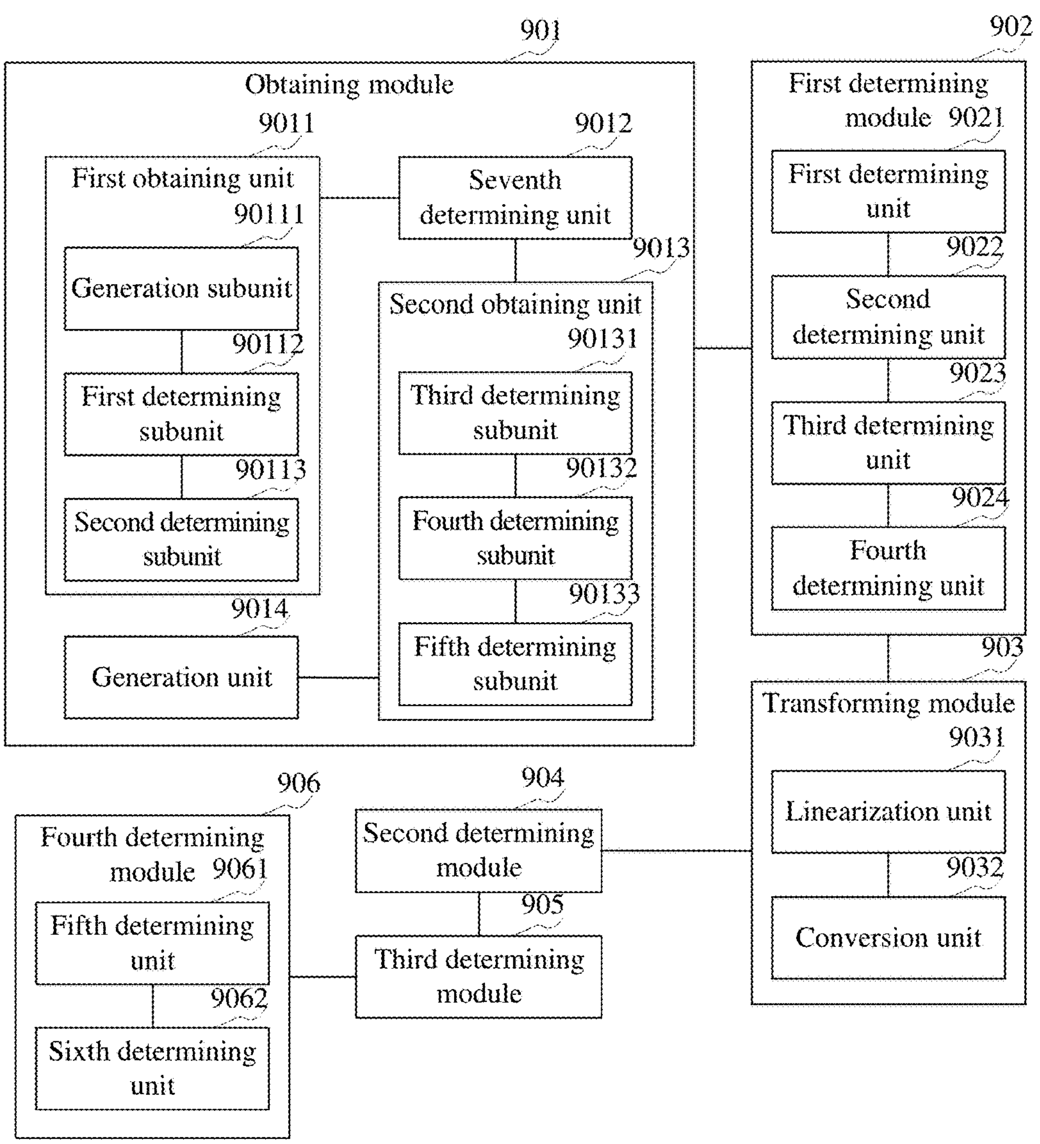
FIG. 10 is a schematic diagram of a structure of a spatial information prediction apparatus according to another exemplary embodiment of this disclosure.

Referring to FIG. 10, FIG. 10 is a schematic diagram of a structure of a spatial information prediction apparatus according to another exemplary embodiment of this disclosure.

In some optional implementations, the first determining module 902 includes: a first determining unit 9021, configured to determine a second two-dimensional detection coordinate of the target object in an initial image captured for the target object by the target camera; a second determining unit 9022, configured to determine an initial three-dimensional coordinate corresponding to the target object in the initial image based on the to-be-updated spatial information, the second two-dimensional detection coordinate, and an intrinsic parameter of the target camera; a third determining unit 9023, configured to determine current pose information of the target camera based on a current movement state of the mobile device and an extrinsic parameter of the target camera; and a fourth determining unit 9024, configured to determine the three-dimensional prediction coordinate of the target object in the current image based on the current pose information and the initial three-dimensional coordinate.

In some optional implementations, the transforming module 903 is further configured to: calculate the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image.

In some optional implementations, the transforming module 903 includes: a linearization unit 9031, configured to linearize the two-dimensional coordinate prediction model based on the three-dimensional prediction coordinate and the to-be-updated spatial information, to obtain a linearized two-dimensional coordinate prediction model; and a transformation unit 9032, configured to transform the to-be-updated spatial information into the image coordinate system by using the linearized two-dimensional coordinate prediction model, to obtain the two-dimensional prediction coordinate.

In some optional implementations, the fourth determining module 906 includes: a fifth determining unit 9061, configured to determine gain information for updating the to-be-updated spatial information based on the linearized two-dimensional coordinate prediction model; and a sixth determining unit 9062, configured to determine the prediction spatial information of the target object in the current image based on the gain information, the error, and the to-be-updated spatial information.

In some optional implementations, the obtaining module 901 includes: a first obtaining unit 9011, configured to obtain first spatial information of the target object in the current image, and determine a convergence state of the first spatial information, wherein the first spatial information includes inverse depth information of the target object; a seventh determining unit 9012, configured to determine the first spatial information as the to-be-updated spatial information in response to that the convergence state indicates that the first spatial information does not converge; or a second obtaining unit 9013, configured to obtain second spatial information of the target object in the current image in response to that the convergence state indicates that the first spatial information converges, wherein the second spatial information includes a three-dimensional coordinate of the target object; and a generation unit 9014, configured to generate the to-be-updated spatial information based on the second spatial information.

In some optional implementations, the first obtaining unit 9011 includes: a generation subunit 90111, configured to generate the to-be-updated spatial information based on first preset spatial information in response to that the current image is the initial image captured for the target object; a first determining subunit 90112, configured to determine first historical prediction spatial information in response to that the current image is not the initial image captured for the target object, wherein the first historical prediction spatial information represents prediction spatial information obtained by performing spatial information prediction on an historical image prior to the current image; and a second determining subunit 90113, configured to determine the first spatial information based on the first historical prediction spatial information.

In some optional implementations, the second obtaining unit 9013 includes: a third determining subunit 90131, configured to determine initial second spatial information based on the converged first spatial information in response to that the current image is an image captured after the first spatial information converges; a fourth determining subunit 90132, configured to determine second historical prediction spatial information in response to that the current image is not an image captured after the first spatial information converges, wherein the second historical prediction spatial information represents prediction spatial information obtained by performing spatial information prediction on an historical image prior to the current image; and a fifth determining subunit 90133, configured to determine the second spatial information based on the second historical prediction spatial information.

According to the spatial information prediction apparatus provided in the foregoing embodiment of this disclosure, three-dimensional coordinate prediction is performed in a real-time manner on the target object in the image captured by the camera, so that the three-dimensional prediction coordinate is transformed into the two-dimensional prediction coordinate, and the error between the two-dimensional detection coordinate and the two-dimensional prediction coordinate that is obtained through real-time image detection is determined. The spatial information is iteratively updated based on the error, and high-precision prediction spatial information of the target object is finally obtained. Compared with conventional image-based ranging methods, according to this embodiment of this disclosure, spatial information prediction is performed by combining detecting a two-dimensional coordinate in a real-time manner with iterative updating the prediction spatial information, which may greatly improve accuracy of performing the spatial information prediction based on the image captured by the camera, while effectively reduce costs as compared to devices such as a laser radar.

Exemplary Electronic Device

An electronic device according to an embodiment of this disclosure is described below with reference to FIG. 11. The electronic device may be any one or two of a terminal device 101 and a server 103 shown in FIG. 1, or a stand-alone device independent from the terminal device 101 and the server 103. The stand-alone device may communicate with the terminal device 101 and the server 103, to receive a collected input signal therefrom.

Figure 11:
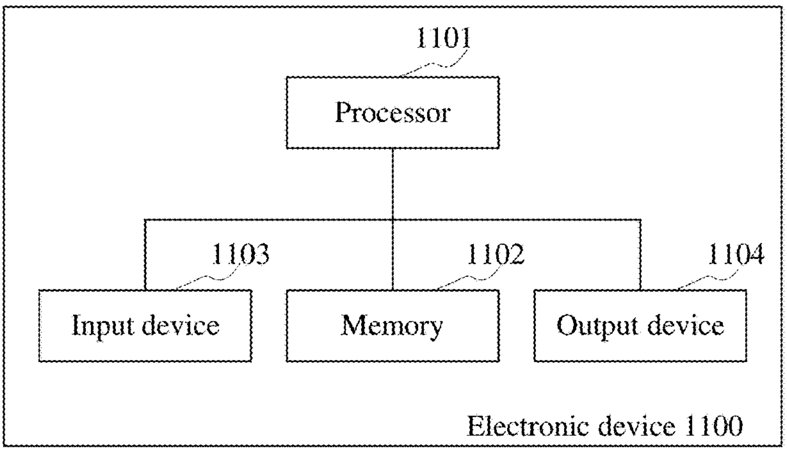
FIG. 11 is a diagram of a structure of an electronic device according to an exemplary embodiment of this disclosure.

FIG. 11 shows a block diagram of an electronic device according to an embodiment of this disclosure.

As shown in FIG. 11, an electronic device 1000 includes one or more processors 1101 and a memory 1102.

The processor 1101 may be a central processing unit (CPU) or another form of processing unit having a data processing capability and/or an instruction execution capability, and may control another component in the electronic device 1000 to implement a desired function.

The memory 1102 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 1101 may execute the program instruction to implement the spatial information prediction method according to various embodiments of this disclosure that are described above and/or other desired functions. Various contents such as images and to-be-updated spatial information may also be stored in the computer readable storage medium.

In an example, the electronic device 1000 may further include an input device 1103 and an output device 1104. These components are connected to each other through a bus system and/or another form of connection mechanism (not shown).

For example, when the electronic device is the terminal device 101 or the server 103, the input device 1103 may be a device such as a camera, a mouse, or a keyboard for inputting images, various commands, and the like. When the electronic device is a stand-alone device, the input device 1103 may be a communication network connector for receiving the input images and various commands from the terminal device 101 and the server 103.

The output device 1104 may output various information, including prediction spatial information, to the outside. The output device 1104 may include, for example, a display, a speaker, a printer, a communication network, and a remote output device connected by the communication network.

Certainly, for simplicity, FIG. 11 shows only some of components in the electronic device 1000 that are related to this disclosure, and components such as a bus and an input/output interface are omitted. In addition, according to specific application situations, the electronic device 1000 may further include any other appropriate components.

Exemplary Computer Program Product and Computer Readable Storage Medium

In addition to the foregoing methods and devices, the embodiments of this disclosure may also provide a computer program product, which includes computer program instructions. When the computer program instructions are run by a processor, the processor is enabled to perform the steps, of the spatial information prediction method according to the embodiments of this disclosure, that are described in the "exemplary method" part described above.

The computer program product may be program code, written with one or any combination of a plurality of programming languages, that is configured to perform the operations in the embodiments of this disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium, which stores computer program instructions. When the computer program instructions are run by the processor, the processor is enabled to perform the steps, of the spatial information prediction method according to the embodiments of this disclosure, that are described in the "exemplary method" part described above.

The computer readable storage medium may be one readable medium or any combination of a plurality of readable media. The readable medium may be a readable signal medium or a readable storage medium. The readable storage medium includes, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

A person skilled in the art may make various modifications and variations to this disclosure without departing from the spirit and the scope of this application. In this way, if these modifications and variations of this application fall within the scope of the claims and equivalent technologies of the claims of this disclosure, this disclosure also intends to include these modifications and variations.

What is claimed is:

1. A spatial information prediction method, comprising:

obtaining to-be-updated spatial information of a target object in a current image captured by a target camera on a mobile device;

determining a three-dimensional prediction coordinate of the target object in the current image based on the to-be-updated spatial information;

transforming the three-dimensional prediction coordinate of the target object into an image coordinate system of the current image, to obtain a two-dimensional prediction coordinate of the target object;

determining a first two-dimensional detection coordinate of the target object in the current image;

determining an error between the first two-dimensional detection coordinate and the two-dimensional prediction coordinate; and determining prediction spatial information of the target object in the current image based on the error and the to-be-updated spatial information, wherein the obtaining to-be-updated spatial information of a target object in a current image captured by a target camera on a mobile device comprises:

obtaining first spatial information of the target object in the current image, and determining a convergence state of the first spatial information, wherein the first spatial information comprises inverse depth information of the target object;

in response to that the convergence state indicates that the first spatial information does not converge, determining the first spatial information as the to-be-updated spatial information; or in response to that the convergence state indicates that the first spatial information converges, obtaining second spatial information of the target object in the current image, wherein the second spatial information comprises a three-dimensional coordinate of the target object; and generating the to-be-updated spatial information based on the second spatial information.

2. The method according to claim 1, wherein the determining a three-dimensional prediction coordinate of the target object in the current image based on the to-be-updated spatial information comprises:

determining a second two-dimensional detection coordinate of the target object in an initial image captured for the target object by the target camera;

determining an initial three-dimensional coordinate corresponding to the target object in the initial image based on the to-be-updated spatial information, the second two-dimensional detection coordinate, and an intrinsic parameter of the target camera;

determining current pose information of the target camera based on a current movement state of the mobile device and an extrinsic parameter of the target camera; and determining the three-dimensional prediction coordinate of the target object in the current image based on the current pose information and the initial three-dimensional coordinate.

3. The method according to claim 2, wherein the transforming the three-dimensional prediction coordinate of the target object into an image coordinate system of the current image, to obtain a two-dimensional prediction coordinate of the target object comprises:

calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image.

4. The method according to claim 3, wherein the calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image comprises:

linearizing the two-dimensional coordinate prediction model based on the three-dimensional prediction coordinate and the to-be-updated spatial information, to obtain a linearized two-dimensional coordinate prediction model; and transforming the to-be-updated spatial information into the image coordinate system by using the linearized two-dimensional coordinate prediction model, to obtain the two-dimensional prediction coordinate.

5. The method according to claim 4, wherein the determining prediction spatial information of the target object in the current image based on the error and the to-be-updated spatial information comprises:

determining gain information for updating the to-be-updated spatial information based on the linearized two-dimensional coordinate prediction model; and determining the prediction spatial information of the target object in the current image based on the gain information, the error, and the to-be-updated spatial information.

6. The method according to claim 1, wherein the obtaining first spatial information of the target object in the current image comprises:

in response to that the current image is the initial image captured for the target object, generating the to-be-updated spatial information based on first preset spatial information;

in response to that the current image is not the initial image captured for the target object, determining first historical prediction spatial information, wherein the first historical prediction spatial information represents prediction spatial information obtained by performing spatial information prediction on a historical image prior to the current image; and determining the first spatial information based on the first historical prediction spatial information.

7. The method according to claim 1, wherein the obtaining second spatial information of the target object in the current image comprises:

in response to that the current image is an image captured after the first spatial information converges, determining initial second spatial information based on the converged first spatial information;

in response to that the current image is not an image captured after the first spatial information converges, determining second historical prediction spatial information, wherein the second historical prediction spatial information represents prediction spatial information obtained by performing spatial information prediction on a historical image prior to the current image; and determining the second spatial information based on the second historical prediction spatial information.

8. A non-transitory computer readable storage medium, wherein the non-transitory computer readable storage medium stores a computer program, and the computer program is used to be executed by a processor to implement a spatial information prediction method, wherein the spatial information prediction method comprises:

obtaining to-be-updated spatial information of a target object in a current image captured by a target camera on a mobile device;

determining a three-dimensional prediction coordinate of the target object in the current image based on the to-be-updated spatial information;

transforming the three-dimensional prediction coordinate of the target object into an image coordinate system of the current image, to obtain a two-dimensional prediction coordinate of the target object;

determining a first two-dimensional detection coordinate of the target object in the current image;

determining an error between the first two-dimensional detection coordinate and the two-dimensional prediction coordinate; and determining prediction spatial information of the target object in the current image based on the error and the to-be-updated spatial information, wherein the obtaining to-be-updated spatial information of a target object in a current image captured by a target camera on a mobile device comprises:

obtaining first spatial information of the target object in the current image, and determining a convergence state of the first spatial information, wherein the first spatial information comprises inverse depth information of the target object;

in response to that the convergence state indicates that the first spatial information does not converge, determining the first spatial information as the to-be-updated spatial information; or in response to that the convergence state indicates that the first spatial information converges, obtaining second spatial information of the target object in the current image, wherein the second spatial information comprises a three-dimensional coordinate of the target object; and generating the to-be-updated spatial information based on the second spatial information.

9. The non-transitory computer readable storage medium according to claim 8, wherein the determining a three-dimensional prediction coordinate of the target object in the current image based on the to-be-updated spatial information comprises:

determining a second two-dimensional detection coordinate of the target object in an initial image captured for the target object by the target camera;

determining an initial three-dimensional coordinate corresponding to the target object in the initial image based on the to-be-updated spatial information, the second two-dimensional detection coordinate, and an intrinsic parameter of the target camera;

determining current pose information of the target camera based on a current movement state of the mobile device and an extrinsic parameter of the target camera; and determining the three-dimensional prediction coordinate of the target object in the current image based on the current pose information and the initial three-dimensional coordinate.

10. The non-transitory computer readable storage medium according to claim 9, wherein the transforming the three-dimensional prediction coordinate of the target object into an image coordinate system of the current image, to obtain a two-dimensional prediction coordinate of the target object comprises:

calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image.

11. The non-transitory computer readable storage medium according to claim 10, wherein the calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image comprises:

linearizing the two-dimensional coordinate prediction model based on the three-dimensional prediction coordinate and the to-be-updated spatial information, to obtain a linearized two-dimensional coordinate prediction model; and transforming the to-be-updated spatial information into the image coordinate system by using the linearized two-dimensional coordinate prediction model, to obtain the two-dimensional prediction coordinate.

12. An electronic device, wherein the electronic device comprises:

a processor; and a memory, configured to store a processor-executable instruction, wherein the processor is configured to read the executable instruction from the memory, and execute the instruction to implement a spatial information prediction method, wherein the spatial information prediction method comprises:

obtaining to-be-updated spatial information of a target object in a current image captured by a target camera on a mobile device;

determining a three-dimensional prediction coordinate of the target object in the current image based on the to-be-updated spatial information;

transforming the three-dimensional prediction coordinate of the target object into an image coordinate system of the current image, to obtain a two-dimensional prediction coordinate of the target object;

determining a first two-dimensional detection coordinate of the target object in the current image;

determining an error between the first two-dimensional detection coordinate and the two-dimensional prediction coordinate; and determining prediction spatial information of the target object in the current image based on the error and the to-be-updated spatial information, wherein the obtaining to-be-updated spatial information of a target object in a current image captured by a target camera on a mobile device comprises:

obtaining first spatial information of the target object in the current image, and determining a convergence state of the first spatial information, wherein the first spatial information comprises inverse depth information of the target object;

in response to that the convergence state indicates that the first spatial information does not converge, determining the first spatial information as the to-be-updated spatial information; or in response to that the convergence state indicates that the first spatial information converges, obtaining second spatial information of the target object in the current image, wherein the second spatial information comprises a three-dimensional coordinate of the target object; and generating the to-be-updated spatial information based on the second spatial information.

13. The electronic device according to claim 12, wherein the determining a three-dimensional prediction coordinate of the target object in the current image based on the to-be-updated spatial information comprises:

determining a second two-dimensional detection coordinate of the target object in an initial image captured for the target object by the target camera;

determining an initial three-dimensional coordinate corresponding to the target object in the initial image based on the to-be-updated spatial information, the second two-dimensional detection coordinate, and an intrinsic parameter of the target camera;

determining current pose information of the target camera based on a current movement state of the mobile device and an extrinsic parameter of the target camera; and determining the three-dimensional prediction coordinate of the target object in the current image based on the current pose information and the initial three-dimensional coordinate.

14. The electronic device according to claim 13, wherein the transforming the three-dimensional prediction coordinate of the target object into an image coordinate system of the current image, to obtain a two-dimensional prediction coordinate of the target object comprises:

calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image.

15. The electronic device according to claim 14, wherein the calculating the three-dimensional prediction coordinate, the intrinsic parameter, and the to-be-updated spatial information by using a preset two-dimensional coordinate prediction model, to obtain the two-dimensional prediction coordinate of the target object in the image coordinate system of the current image comprises:

linearizing the two-dimensional coordinate prediction model based on the three-dimensional prediction coordinate and the to-be-updated spatial information, to obtain a linearized two-dimensional coordinate prediction model; and transforming the to-be-updated spatial information into the image coordinate system by using the linearized two-dimensional coordinate prediction model, to obtain the two-dimensional prediction coordinate.

* * * * *